United States Patent

Uitenbroek

[15] 3,661,652
[45] May 9, 1972

[54] APPARATUS FOR INDICATING THE DENSITY OF A FLUID

[72] Inventor: Gerard Uitenbroek, Stockport, England

[73] Assignee: Oldham International Limited, Manchester, England

[22] Filed: Aug. 14, 1970

[21] Appl. No.: 63,860

[30] Foreign Application Priority Data

Aug. 18, 1969   Great Britain......................41,191/69

[52] U.S. Cl...................................136/182, 73/444, 73/453
[51] Int. Cl......................................H01m 45/06, G01n 9/00
[58] Field of Search................136/182; 73/30, 32, 444, 445, 73/453

[56] References Cited

UNITED STATES PATENTS

| | | | |
|---|---|---|---|
| 2,524,600 | 10/1950 | Raymond et al.........................73/453 |
| 2,922,300 | 1/1960 | Woods........................................73/32 |
| 3,126,745 | 3/1964 | Lutke........................................73/453 |

Primary Examiner—Donald L. Walton
Attorney—Snyder and Butrum

[57] ABSTRACT

Density indicating apparatus comprises a guide member, a fixed magnet at one end of the guide member, a movable magnet movable up and down the guide member and a detector for detecting changes in position of the movable magnet. The two magnets are arranged one above the other so as to repel each other so that when immersed in a fluid, the second magnet takes up a position dependent on its weight, the magnetic forces acting on it and the buoyancy force due to displaced fluid.

14 Claims, 12 Drawing Figures

Patented May 9, 1972 3,661,652

Inventor
GERARD UITENBROEK

Patented May 9, 1972

Inventor
GERARD UITENBKOEK

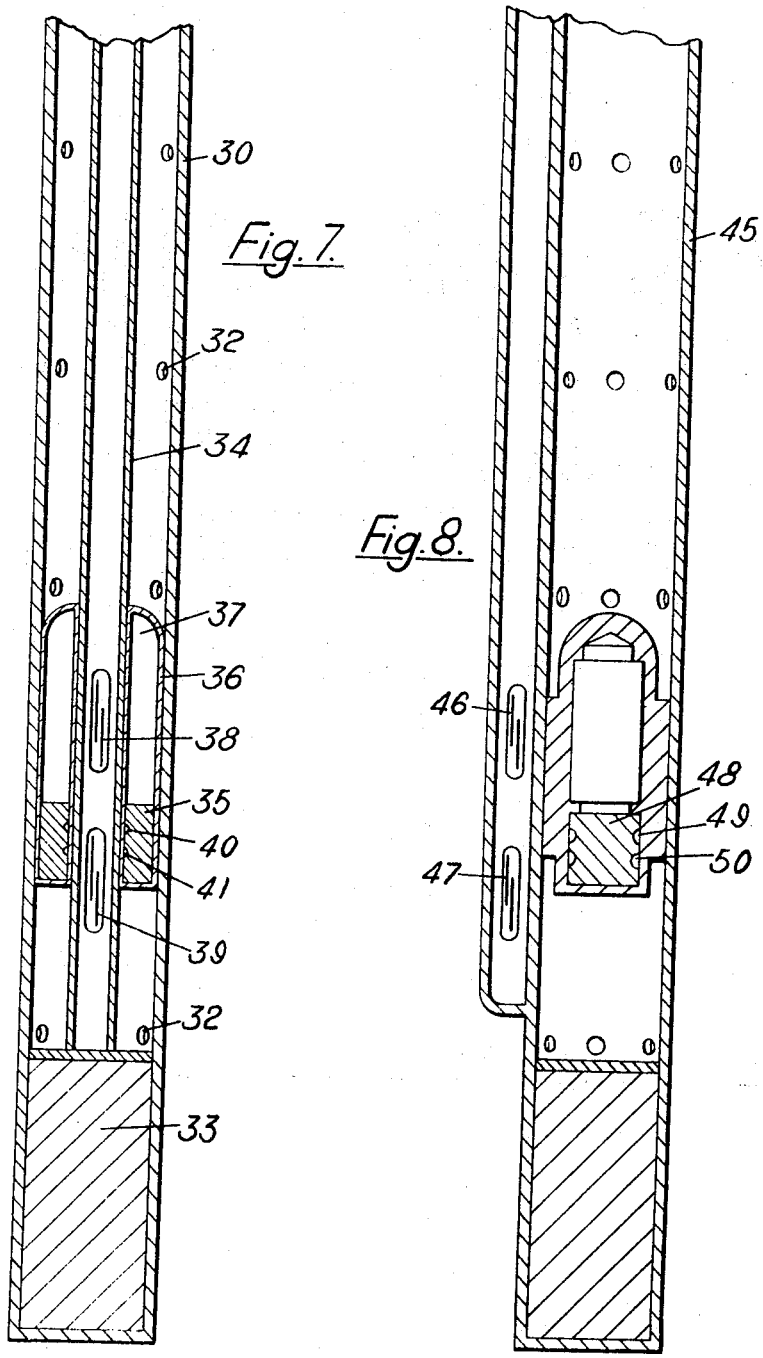

Patented May 9, 1972

Inventor
GERARD UITENBROEK

3,661,652

APPARATUS FOR INDICATING THE DENSITY OF A FLUID

BACKGROUND OF THE INVENTION

This invention relates to apparatus for use in indicating the density of a fluid. The invention may be used with advantage, in, for example, indicating the density of the electrolyte in a lead-acid battery electrolyte during charging and discharging. The density of the electrolyte in a lead-acid battery is directly related to the state of charge of the battery plates and the present invention enables direct use to be made of this property in either controlling the charging process or monitoring the state of charge during the discharging process. When a body is immersed in a fluid there is an upward buoyancy force dependent on the density of the fluid. It is an object of the present invention to provide an improved density indicating apparatus in which a body is arranged to be immersed in a fluid and change its position when the density of the fluid changes.

SUMMARY

According to the present invention there is provided apparatus for use in indicating the density of a fluid including a guide member, a first magnet fixed in position relative to the guide member, a second magnet movable up and down the guide member, and means for detecting changes in the position of the second magnet relative to the first magnet, the two magnets being arranged one above the other so as to repel each other and the guide member being adapted to be immersed in a fluid so that the second magnet is submerged in the fluid and takes up a position in equilibrium dependent on its weight, the magnetic forces acting on it and the buoyancy force due to displaced fluid.

The required buoyancy of the body may be obtained by encapsulating the second magnet in a capsule of a plastics or other polymeric material. However, with fluids having a comparatively high density the body may have sufficient buoyancy without enclosing it in a capsule.

The encapsulation of the second magnet provides protection against corrosion by the fluid, but in cases where the fluid is sufficiently dense and non-corrosive the need for any encapsulation is avoided.

For some uses the first magnet is preferably secured to the guide member below the second magnet. In other cases the first magnet may be secured to the guide member above the second magnet.

In some cases a third magnet may be provided in repulsion with the second magnet and fixed in position relative to the guide member on the side of the second magnet remote from the first magnet so that the second magnet is located between the first and third fixed magnets.

The guide member may comprise a hollow tube within which the second magnet is slidably mounted. In this case the second magnet may be cylindrical and magnetized in the direction of its longitudinal axis.

Alternatively the second magnet comprises an annular member and the guide member extends through a central aperture in the second magnet.

The second magnet may be magnetized in annular domains to provide north and south magnetic poles providing a lateral magnetic field.

When the moving magnet is encapsulated, the capsule of plastics or other polymeric material may include a float chamber to provide the required buoyancy.

A reed switch may be arranged to be operated according to the position of the second magnet relative to the first magnet in order to detect changes in the relative positions of the magnet and provide an indication of the density of the fluid.

In some cases, more than one movable magnet may be provided and arranged to move up and down the guide means, each movable magnet being arranged to repel the adjacent magnet.

The invention includes a lead acid electric battery having apparatus as aforesaid mounted in the battery, with the guide member extending substantially vertically, for measuring the density of electrolyte within the battery.

BRIEF DESCRIPTION OF THE DRAWINGS

FIGS. 7 and 8 show respectively longitudinal sections through modified assemblies;

DESCRIPTION OF THE PREFERRED EMBODIMENT

Figure 1:
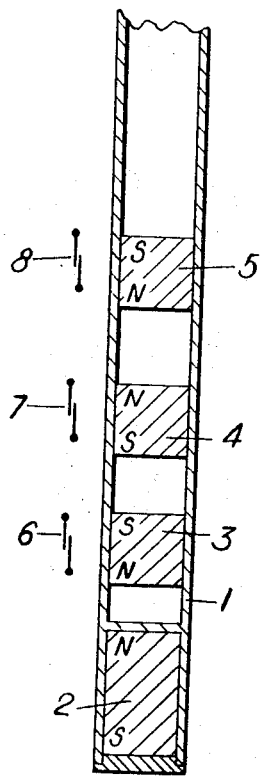
FIG. 1 illustrates diagrammatically a longitudinal cross section through an assembly of a fixed and floating magnets.

Referring to FIG. 1 there is shown a cylindrical tubular container 1 for a system of magnets which includes a fixed magnet 2 and floating magnets 3, 4 and 5 arranged so that they cannot overturn. Each of the magnets 3, 4 and 5 has associated with it respective reed relay switch contacts 6, 7 and 8 arranged outside the tubular container. The magnets, which are cylindrical, are magnetized along their longitudinal axes and they are arranged within the retaining tube or container 1 in such a way that adjacent magnets repel one another. The tube 1 acts as a guide member and retains the magnets in position one above another. The fixed magnet 2 is arranged with its North pole uppermost and the floating magnet 3 with its North pole towards the North pole of magnet 2. Magnet 4 has its South pole downwards so that it is in repulsion with the South pole of magnet 3 and magnet 5 has its North pole facing downwards in repulsion with the North pole of magnet 4. The fixed magnet 2 is encapsulated at the bottom of the tube 1 and, if the assembly is to be used in a fluid which is corrosive, the magnets 3, 4 and 5 may also be encapsulated to prevent damage, although this is not shown in FIG. 1. Means may also be provided to enable the floating magnets to move more easily in the tube 1. The tube 1 may be of glass or some other suitable material, for example, plastics.

Of course the magnets need not be arranged in the particular way shown in FIG. 1 as long as adjacent magnets repel one another.

The magnets 3, 4 and 5 are spaced apart according not only to the magnetic forces acting between them, but also according to the forces exerted upon them due to the displacement by them of the fluid in which they are immersed. The actual position that they assume is a function of their weight, the magnetic forces acting upon them and the force of buoyancy exerted upon them by the fluid in which they are immersed. Thus, since their weights remain substantially constant, the position of the floating magnets within the tube is a direct function of the density of the fluid in which they are immersed. Any changes in this density are indicated by changes in the position of the floating magnets up and down the tube 1, since the magnets will move until the magnetic forces between them have changed to compensate for the changes in force of buoyancy due to change of density. These changes in position of the magnets 3, 4 and 5 may be signalled by the operation of the reed switches 6, 7 and 8. Particular combinations of operation of the reed switches will indicate particular values of density of the fluid in which the magnets are immersed.

In order to provide a practical arrangement with a suitable spacing between the magnets it may be necessary to include the magnets within a capsule having a size which displaces sufficient of the fluid to enable it to be positioned at the desired level. Ideally the weight of the magnet and the capsule should be slightly greater than the maximum buoyancy provided by the fluid in which it is immersed so that the capsule stays submerged at the highest density of the fluid.

In an arrangement for use in a lead acid battery the magnets are preferably arranged to be at a depth at least one-third or half-way below the level of the electrolyte in the battery, but not at the bottom of the electrolyte where the density is not truly indicative of the density throughout the electrolyte.

When the moving magnets are encapsulated, they are positioned within the capsules at the lower end of the capsules so that the center of gravity of a capsule is below its geometrical center.

In an alternative arrangement the fixed magnet is secured to the guide tube above the floating magnets, which are buoyant in the fluid in such a way that the buoyancy force acting upon each of them equals the magnetic forces when each of them is in the position providing the required spacing between them. This system is called a buoyancy system as the moving magnets are buoyant and urged downwardly by repulsion from the fixed magnet. The other system in which the fixed magnet is secured to the bottom of the guide tube is called a suspension system as the repulsion from the fixed magnet urges the moving magnets upwards to keep them suspended in the fluid.

The tubular container or retaining tube is preferably mounted vertically or substantially vertically in the fluid and means, for example clips, may be provided in the container for the fluid into which the tubular container may be placed in order to maintain it in position. Holes may be provided in the tubular container in order to enable the fluid to circulate within it. In a lead acid battery, the holes are large enough to allow electrolyte to pass into the container but not large enough to allow battery gases to pass into the container.

Figure 2:
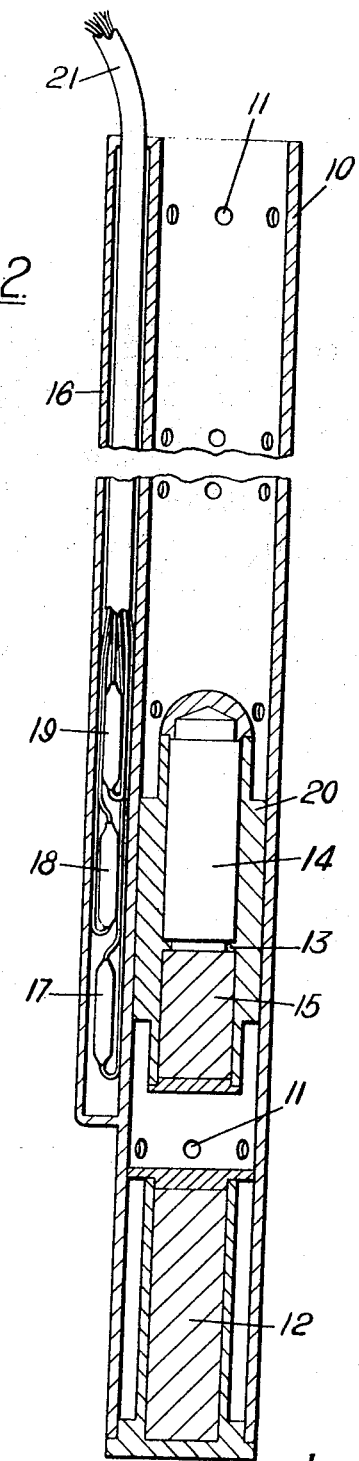
FIG. 2 shows a longitudinal cross section through a practical magnet assembly.
Figure 3:
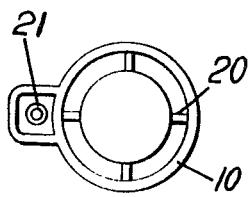
FIG. 3 shows a plan view of the assembly of FIG. 2.

Although an arrangement using three floating magnets has been described with reference to FIG. 1, it is possible to use only one floating magnet and an arrangement will now be described with reference to FIGS. 2, 3, 4, 5 and 6 which may be used in indicating the density of the electrolyte in a lead-acid battery and which employs only one floating magnet. Referring to FIGS. 2 and 3 there is shown a guide tube 10 provided with holes 11 for the entry and exit of electrolyte and having a fixed magnet 12 encapsulated in the bottom of the tube. The tube 10 is made of glass and the holes 11 are of such a size that the density of the electrolyte inside and outside the tube 10 may be equalized while battery gases are prevented from passing through the holes into the tube. Tubes of other material, for example plastics, may be used. Within the tube 10 above the fixed magnet 12 there is a slidable capsule 13 having a float chamber 14 and containing an encapsulated magnet 15. The capsule 13 has guide ribs 20 which enable it to move up and down more easily within the tube 10 and it is made of or coated with a material, for example PTFE, which enables it to move more easily. Outside the tube 10 there is a chamber 16 which contains three reed relay switches 17, 18 and 19 which are connected to associated circuits, not shown, by means of a cable 21.

Figure 4:
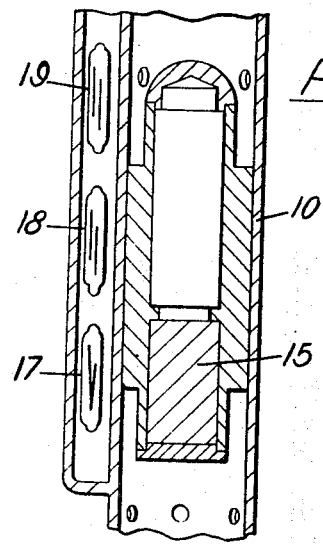
FIGS. 4, 5 and 6 show longitudinal sections through a part of the arrangement of FIG. 2 with the floating magnet in different positions.
Figure 5:
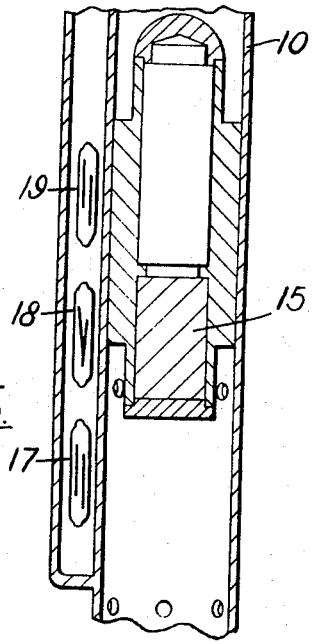
Figure 6:
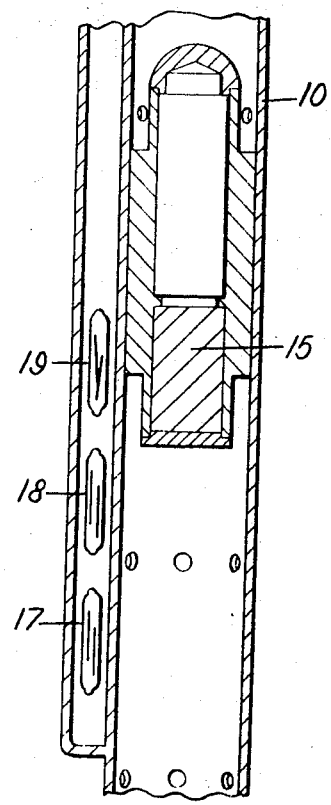

The dimensions of the capsule 13 and the strengths of the magnets 12 and 15 are such that when the assembly is immersed in the electrolyte of a lead acid battery, the capsule 13 floats in the position indicated in FIG. 4 when the specific gravity is low, in the position indicated in FIG. 5 when the specific gravity is at a middle value and in the position indicated in FIG. 6 when the specific gravity of the electrolyte is high. Thus in the position shown in FIG. 4 the contacts 17 are closed and an indication is given to the associated circuit that the specific gravity of the electrolyte is low. When the capsule 13 floats in the position shown in FIG. 5 the specific gravity is at a medium value and the contacts 18 are closed and when the specific gravity is high the capsule 13 floats in the position shown in FIG. 6 and the contacts 19 are closed. Thus three independent signals may be given to an external circuit to indicate these conditions of the electrolyte. As a result of the signals obtained from the switch contacts 17, 18 and 19 it is possible to control the charging rate of a battery or to indicate at some remote point the state of its charge during discharge.

A signal resulting from a change in position of a capsule or from its actual position can be obtained as a function of the electrolyte density in a number of other ways than by means of reed switches.

A moving magnet in a capsule creates a change of magnetic field and the rate of this change can be relayed, but this signal may only be obtained during the movement of the magnet and this arrangement provides a dynamic method.

One or more of the moving capsules may be plated with a metal on its internal surface and when this metallic layer moves closer to or further away from a set of capacitor plates, the changes in capacitance can be relayed.

The uppermost moving capsule can be shaped such that its top closes an opening in a vertical narrow tube, within which a constant heat supply forces electrolyte upward by convection. Closure of the bottom opening in this narrow tube by a rise of the uppermost capsule results in overheating the liquid, and a temperature sensor relays the degree of overheating.

A Hall effect device may be used to detect change in position of the moving capsules since when a magnet capsule comes closer to or moves away from a Hall-probe it influences the voltage measured across the probe. This arrangement provides a static method of producing a signal as distinct from the dynamic arrangement mentioned above. A Hall-probe is a device using a semiconductor material through which a small current is passed. If a magnetic field is applied perpendicular to the direction of the current, a voltage difference is created across the material perpendicular to both the field and the current.

Figure 9:
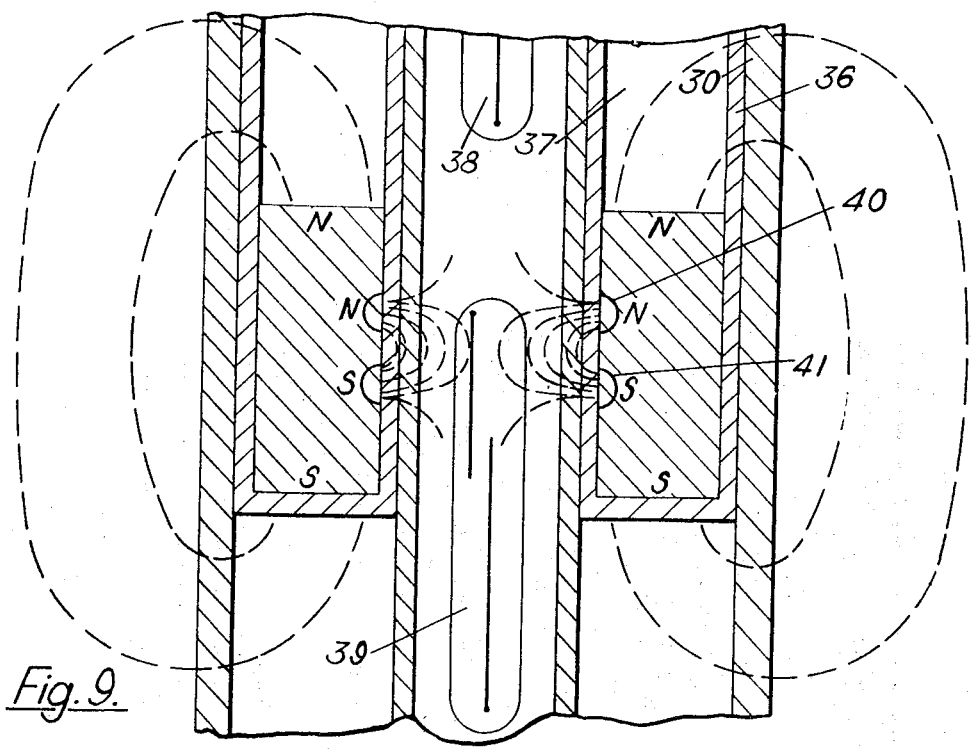
FIGS. 9 and 10 show details of the arrangements shown in FIGS. 7 and 8 respectively.

Referring to FIGS. 7 and 9 there is shown in FIG. 7 a cylindrical tubular container 30 provided with holes 32 for the entry and exit of electrolyte and having a fixed magnet 33 encapsulated in the bottom of the tube. A central guide tube 34 is fixed within the container and around the tube there is an annular magnet 35 which is enclosed within a capsule 36. The capsule 36 has a float chamber 37. Within the guide tube 34 there are two reed relay switches 38 and 39. Referring to FIG. 9 the magnet 35 is shown to be magnetized on its inner periphery in annular domains to provide North and South poles 40 and 41 giving a magnetic field extending inwards in a substantially perpendicular manner to the direction of movement of the capsule. The magnet is still magnetized in its longitudinal direction providing the force of repulsion between it and the fixed magnet 33, but the annular domains provide a higher rate of change of magnetic field when vertical movement takes place.

The central guide tube 34 renders unnecessary the outer container 30 in many applications, but where turbulence occurs in the fluid the container 30 provides protection against disturbance caused by the fluid. The central guide may of course be a solid rod with the switches embedded in the rod or the switches may be arranged externally and a different field pattern be provided.

Figure 10:
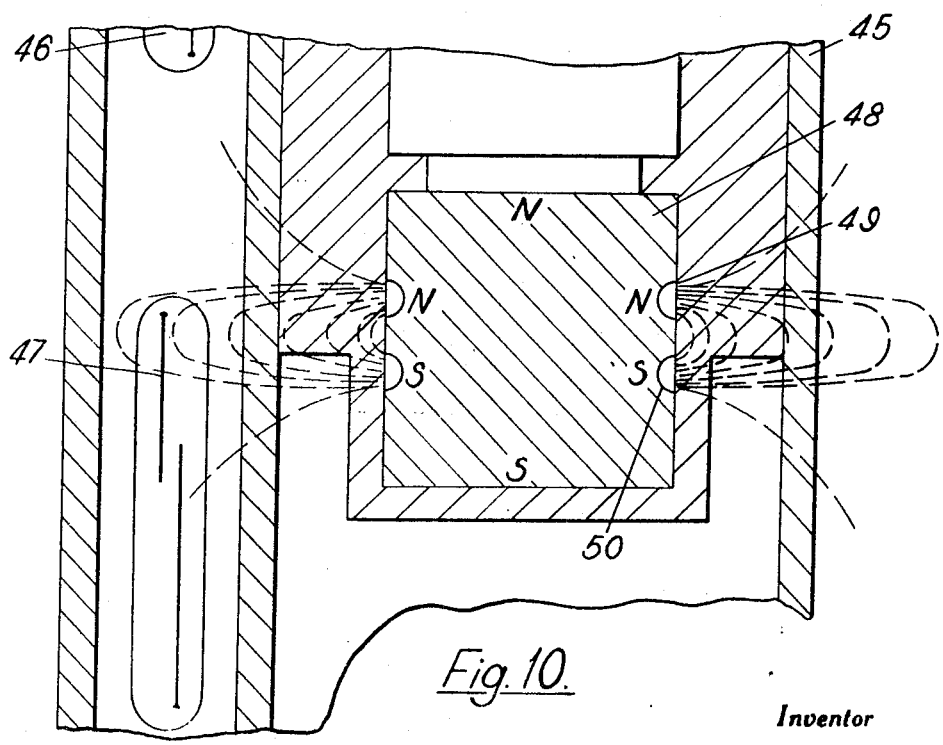

Referring to FIGS. 8 and 10 there is shown a cylindrical guide tube 45 having reed relay switches 46 and 47 arranged externally and a cylindrical "floating" magnet 48 within a capsule in a manner similar to that shown in FIG. 2. The magnet 48 is, however, magnetized at 49 and 50 in annular domains on its external periphery to provide North and South poles producing a magnetic field extending outwards towards the switches 46 and 47 in a substantially perpendicular manner to the direction of movement of the magnet 48 within the container. Thus in addition to the axial repulsive force provided by the axial magnetization of the cylindrical magnet the annular magnetization provides a higher rate of change of the magnetic field, when vertical movement takes place, applied to the switches 46 and 47 thereby giving an improvement in sensitivity. The provision of the annular domains of magnetization is made possible by using magnets, for example ceramic permanent magnets, having a high coercive force.

Figure 12:
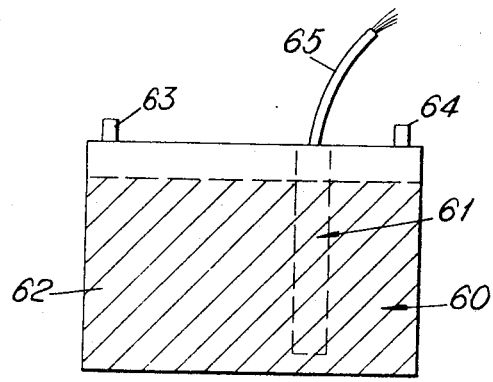
FIG. 12 shows schematically an electric battery including a density measuring device.

FIG. 12 shows schematically a lead acid electric battery 60 including a device 61 for measuring the density of electrolyte 62 within the battery. The device 61 may be similar to any of the devices shown in FIGS. 1, 2, 7 or 8 and already described above. The device 61 is mounted vertically within the battery so that the moving magnets are submerged in the electrolyte. The battery has output terminals 63 and 64 and a lead 65 conveys output signals from the density measuring device 61.

The density of the magnets used ranges, in practice, from approximately 4.8 grams per cubic centimeter to approximately 7.5 grams per cubic centimeter. Thus, unless they are encapsulated in a hollow capsule of substantially greater volume and of liquid-tight construction, their buoyancy will be too small for use in a battery electrolyte. If, for instance, the liquid density is of the order of 1.2 grams per cubic centimeter the average capsule density will need to be only slightly higher (suspension system) or lower (buoyancy system) than 1.2. The density of, say 4.8 grams per cubic centimeter for the magnet will thus have to be diluted by a factor of around 4, by increasing the volume by this factor. For liquids having a sufficiently high density however it may not be necessary to provide extra buoyancy by means of a float chamber.

It is also not essential for the magnet to be included in a one part capsule. The magnet may, for example, be suspended from a float chamber.

In the examples shown in FIGS. 2, 7 and 8 it can be shown that the sensitivity of the devices (that is the extent of movement of the moving magnet for a given change in density) is, in first approximation, dependent on the product of $Vl^{n+1}$, where $V$ is the volume of the capsule incorporating the moving magnet, $l$ is the separation between the fixed and moving magnets and $n$ is a power given in first approximation by the equation $M = A/l^n$, $M$ being the magnetic force between the fixed and moving magnets and $A$ being a contact. It will therefore be seen that the sensitivity is increased as $l$ is increased. During charging of a lead acid battery the density increases and it decreases during discharging. Consequently, when using the suspension system the length $l$ increases during charging and decreases during discharging. Conversely, with the buoyancy system, the length $l$ increases during discharging and decreases during charging. The rate of change of sensitivity can be shown to be dependent in first approximation on the product $V^2 l^{2n+1}$. Consequently there is a sharp rise in the sensitivity of the system as the separation between the fixed and moving magnets increases. It may therefore be seen that charging control is better carried out with the suspension system, whereas discharge monitoring is better carried out with the buoyancy system. The sensitivity required towards the end of either operation is greatest (greatest value of $l$), in order to determine the end of the operation. However, either operation can be carried out by either arrangement and they can both be used equally well for density indication in general. It may also be shown that the smaller the difference between the average density of the capsule and the density of the fluid the greater is the sensitivity of the magnetic suspension system.

Figure 11:
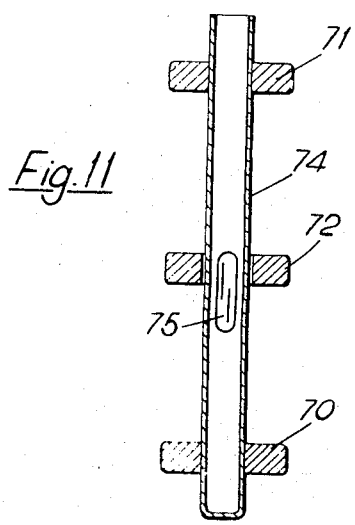
FIG. 11 shows a further embodiment of the invention using two fixed magnets and one movable magnet.

In the above described examples only one fixed magnet has been used. However, as shown in FIG. 11, two fixed magnets 70 and 71 may be used, with a movable magnet 72 movable up and down a guide member 74 between the fixed magnets. In the example shown in FIG. 11, the magnets are each annular in shape with the guide member 74 passing centrally through each of them. The magnets 70 and 71 are fixed to the bottom and top parts of the guide member respectively. The guide member is shown as a hollow tube enclosing a reed switch unit 75. In this case, the sensitivity of density measurement is less than that discussed above in relation to FIGS. 2, 7 and 8. On the other hand the rate of change of sensitivity tends to be less when the moving magnet is approximately mid-way between the fixed magnets. Consequently a more linear output may be obtained when the moving magnet is in this region and this may be useful for some applications of the device.

Although the particular embodiments described have application in monitoring the charge of lead-acid batteries, arrangements in accordance with the present invention may be used in indicating the density of fluids generally and have particular application, for example, in chemical processing plants, in the petroleum industry, in the measurement of alcohol in liquids and in the indication of the density of liquids in storage tanks. Furthermore use may be made of the invention in continuously monitoring the densities of gases or vapors.

In certain applications, for example where the density of a liquid in a glass container is being monitored, the fixed magnet may be arranged outside and beneath the container during manufacture and the retaining tube may be designed to fit into a pocket or recess, or otherwise be clamped in the container in a fixed position so that the floating magnet or magnets are substantially on the vertical axis passing through the fixed magnet.

The magnets may, for example, be made of ceramic material, including ferrites made from sintered mixtures of barium oxide and ferric oxide. Alternatively metal alloy magnets, for example, cobalt-nickel-iron, cobalt-platinum or a system containing aluminum with either one or more of the metals nickel, cobalt or iron may be used.

In the above described examples, the permanent magnets are arranged to move up and down a vertical axis. Although it is preferred to arrange the axis vertically to reduce friction, it is possible to arrange the axis of movement of the magnets within a range of 30° to the vertical.

The capsules may have a spherical or prolate ellipsoid shape so that when guided within a tube the friction between the capsules and the walls of the tube remains low when the tube is tilted out of the vertical. The center of gravity of the capsules is so arranged that the "floating" magnet remains in the lowermost part of the capsule when the tube is tilted.

I claim:

1. Apparatus for use in indicating the density of a fluid which apparatus includes a guide member, a first magnet fixed in position relative to the guide member, a second magnet movable up and down the guide member, and means for detecting changes in the position of the second magnet relative to the first magnet, the two magnets being arranged one above the other so as to repel each other and the guide member being adapted to be immersed in a fluid so that the second magnet is submerged in the fluid and takes up a position in equilibrium dependent on its weight, the magnetic forces acting on it, and the buoyancy force due to displaced fluid.

2. Apparatus as claimed in claim 1 in which the first magnet is secured to the guide member below the second magnet.

3. Apparatus as claimed in claim 1 in which the first magnet is secured to the guide member above the second magnet.

4. Apparatus as claimed in claim 2 in which a third magnet is provided in repulsion with the second magnet and fixed in position above the second magnet.

5. Apparatus as claimed in claim 1 in which the guide member comprises a hollow tube within which the second magnet is slidably mounted.

6. Apparatus as claimed in claim 5 in which the second magnet is cylindrical and is magnetized in the direction of its longitudinal axis.

7. Apparatus as claimed in claim 1 in which the second magnet comprises an annular member and the guide member extends through a central aperture in the second magnet.

8. Apparatus as claimed in claim 7 wherein the second magnet is magnetized in annular domains to provide north and south magnetic poles providing a lateral magnetic field.

9. Apparatus as claimed in claim 1 wherein the second magnet is encapsulated in the lower part of a capsule of plastics material thereby providing the magnet with a required degree of buoyancy in a fluid whose density is to be indicated.

10. Apparatus as claimed in claim 9 in which the capsule of plastics material includes a float chamber to provide the required buoyancy.

11. Apparatus as claimed in claim 1 including a reed switch arranged to be operated according to the position of the second magnet relative to the first magnet in order to detect changes in the relative positions of the magnet and provide an indication of the density of the fluid.

12. Apparatus as claimed in claim 1 in which more than one movable magnet is provided and arranged to move up and down the guide means, each movable magnet being arranged to repel the adjacent magnet.

13. A lead acid electric battery including apparatus as claimed in claim 1 mounted in the battery with the guide member extending substantially vertically, for measuring the density of electrolyte within the battery.

14. A lead acid electric battery as claimed in claim 13 in which the guide member comprises a tubular container having holes passing through its walls which are large enough to allow electrolyte to pass through but not large enough to allow battery gases to pass into the container.

* * * * *